United States Patent [19]

Styles et al.

[11] 3,966,315

[45] June 29, 1976

[54] LENS FOCUSING MEANS FOR SLIDE PROJECTORS

[75] Inventors: Robert E. Styles; John C. Les Veaux, both of Sydney, Australia

[73] Assignee: Hanimex Pty. Ltd., Australia

[22] Filed: Dec. 1, 1975

[21] Appl. No.: 636,592

Related U.S. Application Data

[62] Division of Ser. No. 545,614, Jan. 30, 1975.

[52] U.S. Cl. .............................. 353/101; 350/255; 352/140; 354/195
[51] Int. Cl. ....................... G02b 7/02; G03b 3/00; G03b 21/14
[58] Field of Search .................. 353/101; 350/255; 352/139, 140; 354/159, 195, 286

[56] References Cited
UNITED STATES PATENTS

| | | | |
|---|---|---|---|
| 3,134,298 | 5/1964 | Volkholz | 353/101 |
| 3,631,786 | 1/1972 | Crapsey | 352/140 |
| 3,639,048 | 2/1972 | Heaney et al. | 352/140 |
| 3,785,727 | 1/1974 | Wessner | 352/140 |
| 3,861,794 | 1/1975 | Sobotta | 353/101 |

FOREIGN PATENTS OR APPLICATIONS

| | | | |
|---|---|---|---|
| 860,741 | 1961 | United Kingdom | 353/101 |
| 1,161,409 | 8/1969 | United Kingdom | 350/255 |

Primary Examiner—Richard E. Aegerter
Assistant Examiner—Steven L. Stephan
Attorney, Agent, or Firm—Fulwider, Patton, Rieber, Lee & Utecht

[57] ABSTRACT

Means to manually or power focus the adjustable lens unit of the projector. The power adjustment can be made irrespective of the position of the adjustable lens unit and safety features are incorporated which prevent locking and possible damage to the adjustment means when the limit of adjustment of the lens unit in a given direction has been reached.

5 Claims, 3 Drawing Figures

LENS FOCUSING MEANS FOR SLIDE PROJECTORS

CROSS-REFERENCE TO RELATED APPLICATION

This is a division of co-pending application Ser. No. 545,614, filed Jan. 30, 1975, entitled IMPROVEMENTS IN SLIDE PROJECTORS.

BACKGROUND OF THE INVENTION

This invention relates to improvements in slide projectors of the type which utilizes an adjustable lens unit to enlarge images on small slides which are located in the path of a light beam.

The object of the invention is the provision of means to manually or power focus the adjustable lens unit of the projector. The power adjustment can be made irrespective of the position of the adjustable lens unit and safety features are incorporated which prevent locking and possible damage to the adjustment means when the limit of adjustment of the lens unit in a given direction has been reached.

BRIEF DESCRIPTION OF THE DRAWINGS

A preferred embodiment of the invention is hereinafter described with reference to the drawings in which.

DETAILED DESCRIPTION

Figure 1:
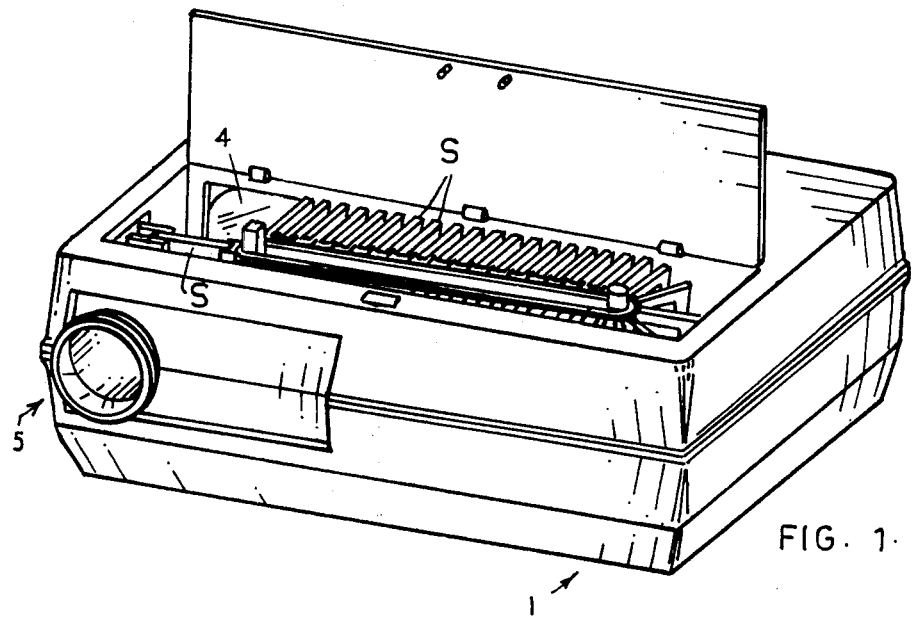
FIG. 1 is a front perspective view of a typical slide projector with the lid open to show a slide magazine and part of the projector lens system.

The projector broadly comprises a casing 1 having an internally mounted stationary lens unit incorporating a globe 2, reflector 3 and stationary lenses 4 and an adjustable focusing lens unit 5. In a recess 6 in the casing 1 there is located means to advance an endless belt type slide magazine 7 of known type in which is mounted a plurality of slides S individually advanced into and removed from the line of projection by a known mechanism forming no part of this invention. The present invention is however not to be considered as being limited to use in the specific type of projector illustrated.

The lens unit 5 of the projector may be manually and power focused and a safety feature is provided whereby power operation cannot cause damage to the power focusing means or the lens unit or its mountings.

Figure 3:
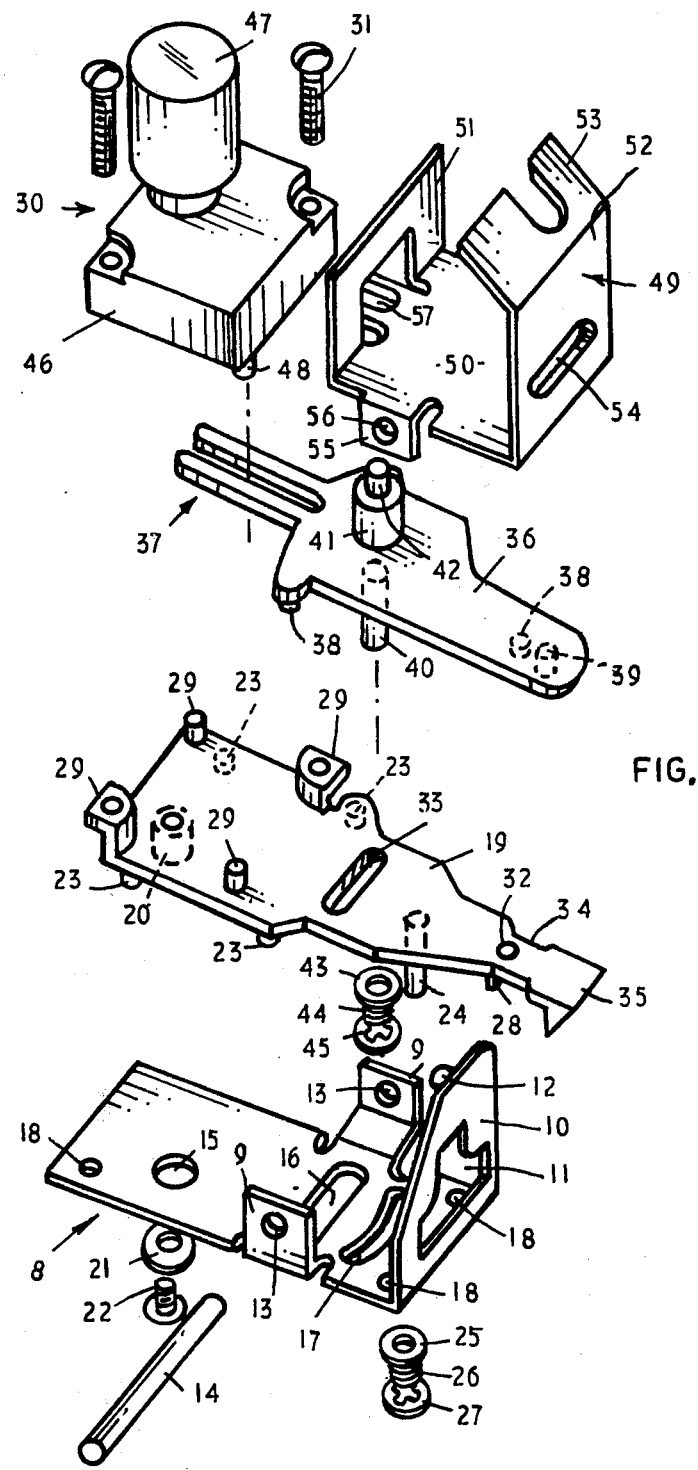
FIG. 3 is an exploded perspective view of the components of the lens unit support and the mechanism for focusing.

The lens unit power focusing means is shown in detail in FIG. 3. A base plate 8 is provided having upstanding lugs 9 and an upstanding end 10. The end 10 has an opening 11 therein and a peg 12 extending normal over the base plate 8. The lugs 9 have holes 13 therein to support a guide bar 14. The base plate 8 has a first hole 16 therein, a straight slot 16 therein and a curved slot 17 therein. Holes 18 in the base plate 8 permit fixing screws to be used to secure the base plate 8 to the casing of the projector. Pivotally mounted on the base plate 8 is a first platform 19 having an underboss 20 which enters into the hole 15 to pivotally connect the platform 19 to the base frame and a keeper washer 21 and screw 22 is used to hold the components together.

Short underbosses 23 support the platform 19 on the base plate 8.

A rod 24 projecting downwardly from the underface of platform 19 extends through slot 17 and a friction washer 25, spring 20 and clip 27 are mounted thereon. The washer 25 exerts a frictional drag on the underface of plate 8. The platform 19 also has a short underleg 28 which bears on the upper face of the base plate 8.

On the upper face of platform 19 are four bosses 29 two having holes therein, to support a motor gearbox unit 30 held by screws 31 to the bosses 29. There is also a hole 32 in the upper face of platform 19 and a slot 33 therethrough.

The end portion 34 of platform is reduced in which to project through hole 11 in end 10 of the base plate and the portion 34 has a lug 35 on it whereby the platform can be manually pivoted about the 20 to 15 pivotal connection.

Above platform 19 is mounted a second platform 36 having a forked end part 37, underface pads 38, a first underface pin 39 (which engages hole 32), a second underface pin 40 (which passes through slot 33) and an upstanding boss 41 having a central upstanding pivot pin portion 42. A friction washer 43, a spring 44 and a clip 45 are mounted on pin 40 so washer 43 exerts a frictional drag on th underface of platform 19. The slot 16 provides clearance for the parts 40, and 43 to 45.

The motor gearbox assembly 30 comprises a gearbox 46 with a motor 47 fixed thereto. The shaft of the motor 47 is coupled through a gear speed reduction, of any suitable type, to pin 48 which travels in a circle (i.e., it is eccentric) as the motor rotates. The pin 48 engages between the legs of the forked end 37 of the upper platform 36. As the motor rotates, the pin to forked end connection (48–37) causes the platform 36 to pivot about the pin to hole connection 39–32 with the pads 38 pulled into friction engagement with the upper face of the first platform 19 by the spring assembly 43–45.

Figure 2:
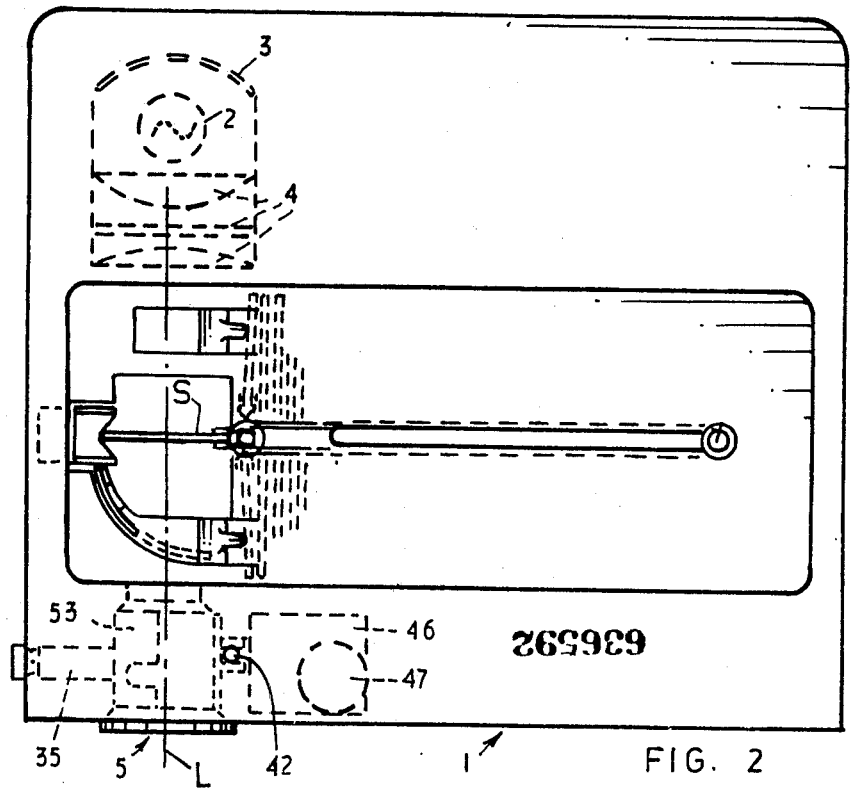
FIG. 2 is a plan view of the projector of FIG. 1 with the lens system including the adjustable lens unit shown in dotted outline.

Disposed above the upper platform is a generally "U"-shaped lens carrier 49 comprising a bottom 50, two upturned sides 51 and 52. A lens tube 5 (of known type shown in FIG. 2) is clamped between the sides 51 and 52 and below an inturned portion 53 of side 52. The side 49 has a slot 54 therein which is close sliding fit on peg 12. Two downturned legs 55 have holes 56 therein which slide on guide bar 14. A forked leg 57 embraces the pivot pin 42.

The operation of the lens focusing means is as follows, it is to be remembered that an essential aspect of the focusing means is that the lens unit 5 always moves in a straight line on guide bar 14.

In operation, manual movement of the lens can be achieved by manual movement of platform 19 through lug 35. Platform 19 is connected to lens carrier 49 through the pin 42 and fork 57 of the lens carrier. Thus arcuate movement of the first platform about its pivot point 20-15 will result in rectilinear motion of the lens unit on the guide bar 14 and sliding of pin 42 in the fork 57. In the event of power operation being required, irrespective of the manual positioning of the assembly, the motor 47 is energized, the upper platform moves about its pivot 39-32, and as a result of the pin 42 acting on the sides of fork 57 the lens carrier 52 is again given rectilinear motion along bar 14.

The safety feature aforementioned results out of the pivotal connection between the two platforms. If for example the lens unit 5 has been adjusted to the full manual movement or is approaching the full manual movement and power operation is initiated, the lens carrier will be forced to the end of the guide bar 14 and against the lugs 9 supporting the bar 14 resulting in the pivot pin 42 becoming a fulcrum, the forked end 37 will still move under the influence of pin 48 and the pin 39 acting through hole 32 will urge the lower platform in the opposite direction causing it to pivot its pivotal connection 20-15. In this way it is impossible for power operation of the lens unit to build up forces or pressures or stresses which will damage the mechanism concerned. The motor 47 is again a reversible motor so that forward and reverse movement of the lens carrier and therefore the lens unit can be achieved for correctly focusing the lens unit for the particular slide being projected.

We claim:

1. In a slide projector having a casing in which is mounted means to hold a slide in projection position in alignment with a lens system including a movable lens unit:

a lens unit focusing mechanism comprising a sub-frame fixed to the casing, a first platform, a pivotal connection between the first platform and the sub-frame;

first friction producing means to hold the first platform in frictional engagement with the sub-frame to inhibit pivotal movement therebetween, a second platform, a pivotal connection between the second platform and the first platform, a second friction producing means to hold the second platform in frictional engagement with the first platform to inhibit pivotal movement therebetween, a lens holder, bearings on the lens holder, a shaft in sliding engagement with the bearings, shaft holding means on the sub-frame in which said shaft is held, a slot in said second platform, a drive assembly fixed to the first platform, a peg on the drive assembly movable thereby in a circular path and engaging in the slot in the second platform, a first slot in the lens holder and a pivot pin on the second platform in engagement with the slot in the lens holder, a second slot in the lens holder parallel to the shaft and a peg on the sub-frame in engagement with the second slot;

manual pivoting movement of the first platform relative to the sub-frame being transferred through the pivot pin on the second platform to a side of the first slot in the lens holder to cause the lens holder to move along said shaft and said peg on the sub-frame to slide in the second slot in the lens holder, activation of the drive assembly causing pivotal movement of the second platform relative to the first platform by engagement of the driving assembly peg with a side of the slot in the second platform and the pivotal movement of the second platform being transferred through the pivot pin on the second platform to a side of the first slot in the lens holder to cause the lens holder to move along said shaft and said peg on the sub-frame to slide in the second slot in the lens holder.

2. In a slide projector a lens unit focusing mechanism as claimed in claim 1 wherein the friction producing means comprises a slot in the sub-frame, a slot in the first platform, a pin fixed to the first platform and a pin fixed to the second platform passing respectively through the slots in the sub-frame and the first platform, a friction washer on each pin, a spring and clip on each pin to apply a spring force to urge the friction washers into engagement with the sub-frame and the first platform respectively.

3. In a slide projector a lens unit focusing mechanism as claimed in claim 1 having bosses on the underface of the first and second platform to respectively bear on the top faces of the sub-frame and the first platform.

4. In a slide projector a lens unit focusing mechanism as claimed in claim 1 having a reversible electric motor coupled to a gearbox to provide the drive assembly.

5. In a slide projector having a casing in which is mounted means to hold a slide in projection position in alignment with a lens system including a movable lens unit:

a lens unit focusing mechanism comprising a sub-frame fixed to the casing, a pivotal frictional connection between a first platform and the sub-frame;

a pivotal frictional connection between a second platform and the first platform, an elongated guide mounted on the sub-frame, a lens holder slidably supported on the guide, a first sliding connection between the lens holder and the second platform, a second connection allowing sliding movement parallel to the guide and connecting the lens holder to the sub-frame, a drive assembly fixed to the first platform, a peg forming part of the drive assembly movable in a circular path, a slot in the second platform engaged by the peg so that activation of the drive assembly causes the peg to rotate and the lens holder to slide on the guide relative to the sub-frame due to the transference of the peg motion to the second platform through said first connection.

* * * * *

UNITED STATES PATENT AND TRADEMARK OFFICE
CERTIFICATE OF CORRECTION

PATENT NO. : 3,966,315
DATED : June 29, 1976
INVENTOR(S) : Robert E. Styles and John C. Les Veaux It is certified that error appears in the above—identified patent and that said Letters Patent are hereby corrected as shown below:

Column 2, line 14, "which" should be --width--;

line 26, "th" should be --the--.

Signed and Sealed this

Nineteenth Day of April 1977

[SEAL]

Attest:

RUTH C. MASON
*Attesting Officer*

C. MARSHALL DANN
*Commissioner of Patents and Trademarks*